US006079911A

United States Patent [19]

Wangermann et al.

[11] Patent Number: 6,079,911
[45] Date of Patent: *Jun. 27, 2000

[54] METHOD AND DEVICE FOR THE CONTAMINATION-FREE METERING AND CONVEYING OF SOLID POWDERS WHICH ARE TO BE DISPERSED OR DISSOLVED

[75] Inventors: Klaus Wangermann, Krefeld; Alan Viets, Leverkusen; Bernd Klinksiek, Bergisch Gladbach, all of Germany

[73] Assignee: Bayer Aktiengesellschaft, Leverkusen, Germany

[ * ] Notice: This patent issued on a continued prosecution application filed under 37 CFR 1.53(d), and is subject to the twenty year patent term provisions of 35 U.S.C. 154(a)(2).

[21] Appl. No.: 08/866,861

[22] Filed: May 30, 1997

[30] Foreign Application Priority Data

Jun. 3, 1996 [DE] Germany ........................... 196 22 191

[51] Int. Cl.[7] ........................ B65G 53/42

[52] U.S. Cl. ........................ 406/132; 406/47; 406/48; 406/122; 406/128; 406/132; 406/133; 406/144

[58] Field of Search ........................ 406/47, 48, 122, 406/128, 132, 133, 144

[56] References Cited

U.S. PATENT DOCUMENTS

| | | | |
|---|---|---|---|
| 3,819,157 | 6/1974 | Markfelt | 366/101 |
| 3,881,656 | 5/1975 | Markfelt et al. | 239/336 |
| 4,426,156 | 1/1984 | Adamo et al. | 366/156.1 |

FOREIGN PATENT DOCUMENTS

| | | |
|---|---|---|
| 78343 | 5/1983 | European Pat. Off. . |
| 2360489 | 3/1978 | France . |
| 7532191 | 2/1976 | Germany . |
| 7533927 | 4/1976 | Germany . |
| 3202915 | 8/1983 | Germany . |
| 4327761 | 3/1995 | Germany . |
| 2176847 | 1/1987 | United Kingdom . |

*Primary Examiner*—Christopher P. Ellis
*Assistant Examiner*—Jeffrey A. Shapiro
*Attorney, Agent, or Firm*—Norris, McLauglin & Marcus, P.A.

[57] ABSTRACT

A device for the contamination-free conveying of powders which has a movable cone arranged within a discharge hopper, which, when in an open position, forms an annular gap between itself and the wall of the hopper. The amount of powder which is discharged through the annular gap is controlled by the amount of time the cone remains in the open position. The powder which is discharged from the hopper is supplied to a liquid jet pump, and is conveyed by the liquid jet formed by the liquid jet pump to a dispersing or dissolving tank.

10 Claims, 2 Drawing Sheets

METHOD AND DEVICE FOR THE CONTAMINATION-FREE METERING AND CONVEYING OF SOLID POWDERS WHICH ARE TO BE DISPERSED OR DISSOLVED

A problem which is frequently encountered in engineering is the metering and conveying of solid powders which form dust and/or are harmful to health and which are then to be dispersed or dissolved in a liquid. For example, solid, pulverulent plant protection agents, which are subsequently to be applied to the field, first have to be dissolved or dispersed in a spraying tank.

The proposal according to the invention which is detailed below is particularly geared to the requirements of agriculture: low concentration of below 10% by weight of the solid in the dispersing agent or solvent; low metered quantity per metering operation, typically a few kg; sturdy, space-saving design without rotating parts, with the exception of a liquid pump, in particular a water pump; and dry powder metering, so that clumping or agglomeration of solid powder which is not conveyed during the metering operation in question is reliably avoided. Because of its sturdy and uncomplicated structure, the invention is particularly suitable for mobile use at the edge of the field, in order to refill the spraying tank from which the plant protection agent is applied to the field each time it is emptied.

However, the invention is not restricted to agriculture. Rather, it can also advantageously be used in other areas of engineering.

The subject-matter of the present invention is a method for the contamination-free metering and conveying of solid powders, which are to be dispersed or dissolved, from a solids storage container to a dispersing or dissolving tank, which is characterized in that the solids storage container has a discharge hopper, coaxially with which a downwardly widening cone is arranged, which in the closure position rests with its base edge on the hopper inner wall and in the open position is raised from the hopper wall so as to leave open an annular gap, the solid powder being supplied, in the open position of the cone, in a freely flowing manner to a liquid jet pump which is operated with the dispersing agent or solvent, being dispersed in the liquid jet and being conveyed by the latter into the dispersing or dissolving tank, the amount of solid being metered with reference to a calibration curve by controlling the time for which the cone is in the open position, and the dispersing or dissolving tank being filled with the dispersing agent or solvent in accordance with the desired dilution level.

Although solids storage containers with a discharge hopper and generally vibrating closure cone are known per se, it was not to be anticipated that the solid powder would flow through the annular gap at a temporally constant flow in the open position of the cone and that therefore the amount of solid flowing out could be monitored, after appropriate calibration, by means of the opening time of the cone. It has been found that, if several metering operations are carried out, in each case over the course of a few minutes, the amounts of solid which have passed through the annular gap are proportional to the respective opening time to within a few per cent. Clearly, the metering accuracy of the method according to the invention is effected by an interaction with the reduced pressure generated by the liquid jet pump in the space below the closure cone. The reduced pressure generated continues through the cone, into the solid material above the cone, due to the non-gastight closure by the cone, where it results in a compaction which is broken up by opening the cone, which clearly brings the solid into a particularly readily flowable state.

Furthermore, it has been found that the liquid jet pump is suitable for uniformly transporting and for dispersing the solid supplied in a dry state without prior slurrying of the solid if the mass flow ratio of liquid jet and solid is below 30, preferably in the range between 1 and 20, particularly preferably in the range between 5 and 15.

In accordance with a preferred embodiment of the invention, a ball valve is provided between the discharge hopper and the jet pump, which valve seals the hopper in a liquid-tight manner with respect to the jet pump after metering has finished.

Furthermore, according to the invention a cleaning nozzle is preferably provided transversely to the direction of the liquid jet, by means of which cleaning nozzle the jet pump can be freed of solid residues which have remained in the jet pump by supplying dispersing agent or solvent with the ball valve closed.

Furthermore, in order to ensure the metering accuracy, the free annular-gap width in the open position of the cone should preferably be at least three times, in particular, five to ten times, the mesh width of a screen which allows through 90% by weight of the solid powder.

The present invention also relates to a device for the contamination-free metering and conveying of solid powders, which are to be dispersed or dissolved, from a storage container for the solid powder to a dispersing or dissolving tank, the device comprising a discharge hopper for the solid arranged beneath the storage container, a cone being arranged in the discharge hopper, which cone is movable in the axial direction, widens downwards and in the closure position rests with its base edge on the inside of the hopper wall and in the open position is raised from the hopper wall so as to leave free an annular outlet gap, and further comprising a liquid jet pump which is arranged beneath the hopper, transversely to the axis thereof and feeds into the connection line to the dispersing or dissolving tank.

In this case, the a liquid jet pump comprises a propelling nozzle, a intake chamber, a mixing chamber and a diffuser, the free jet generated between a propelling nozzle and the mixing chamber, i.e. transversely through the intake chamber, preferably being longer than the cross-section of the hopper discharge pipe. Preferably, the ratio of the internal diameters of mixer tube and propelling nozzle is between 2 and 3. The included angle of the diffuser may preferably be 2° to 5°.

Furthermore, according to the invention it may preferably be provided that guide plates are provided which are axially parallel in the connection pipe between hopper outlet and jet pump and prevent a rotating flow of the solid at the hopper discharge.

The invention is explained in more detail below with reference to the appended figures.

Figures 1, 2:
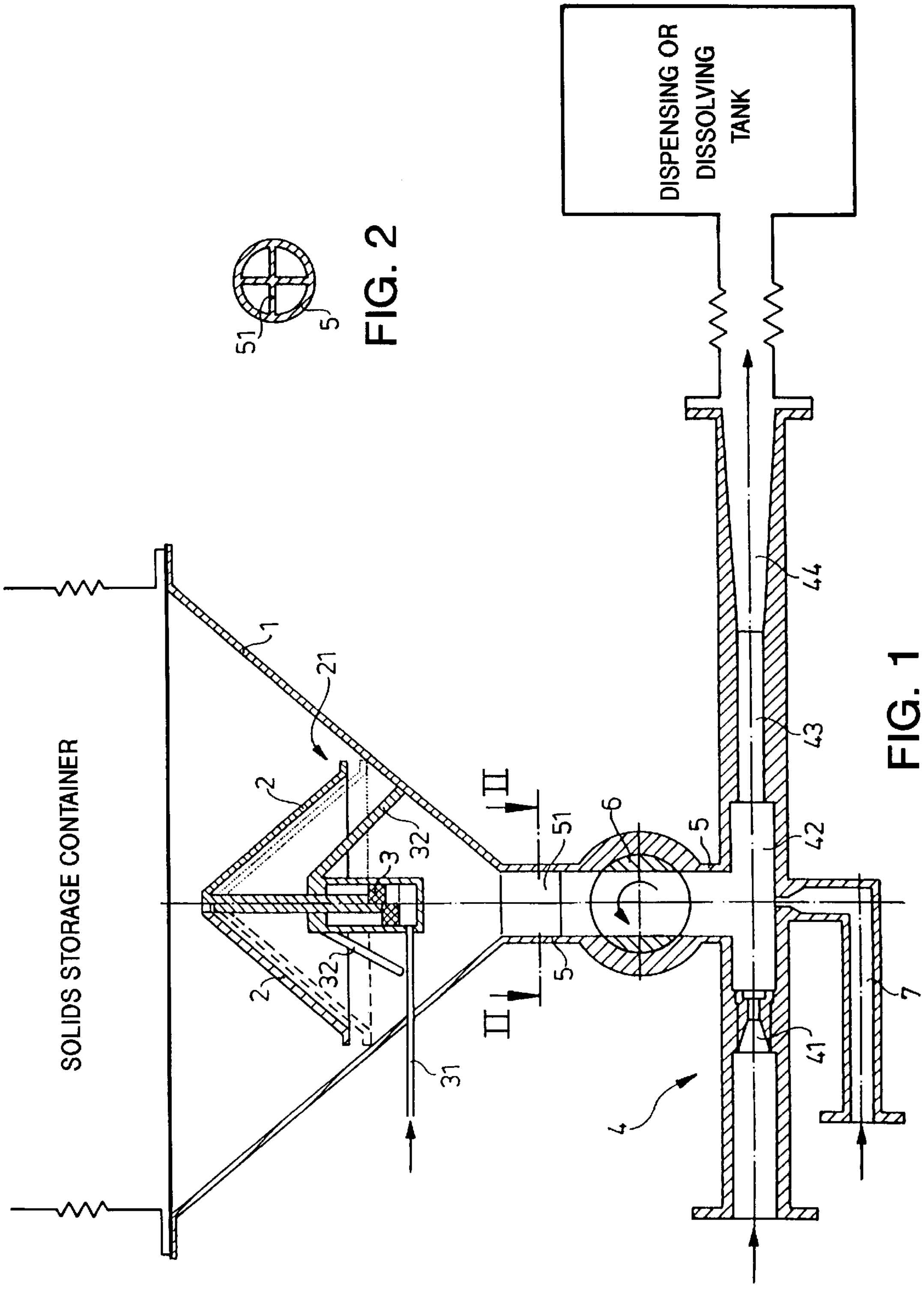
FIG. 1 shows a cross-section through the device according to the invention below the storage container.
FIG. 2 shows a section 11—11 through the device in accordance with FIG. 1, in order to illustrate the guide plates.
Figure 3:
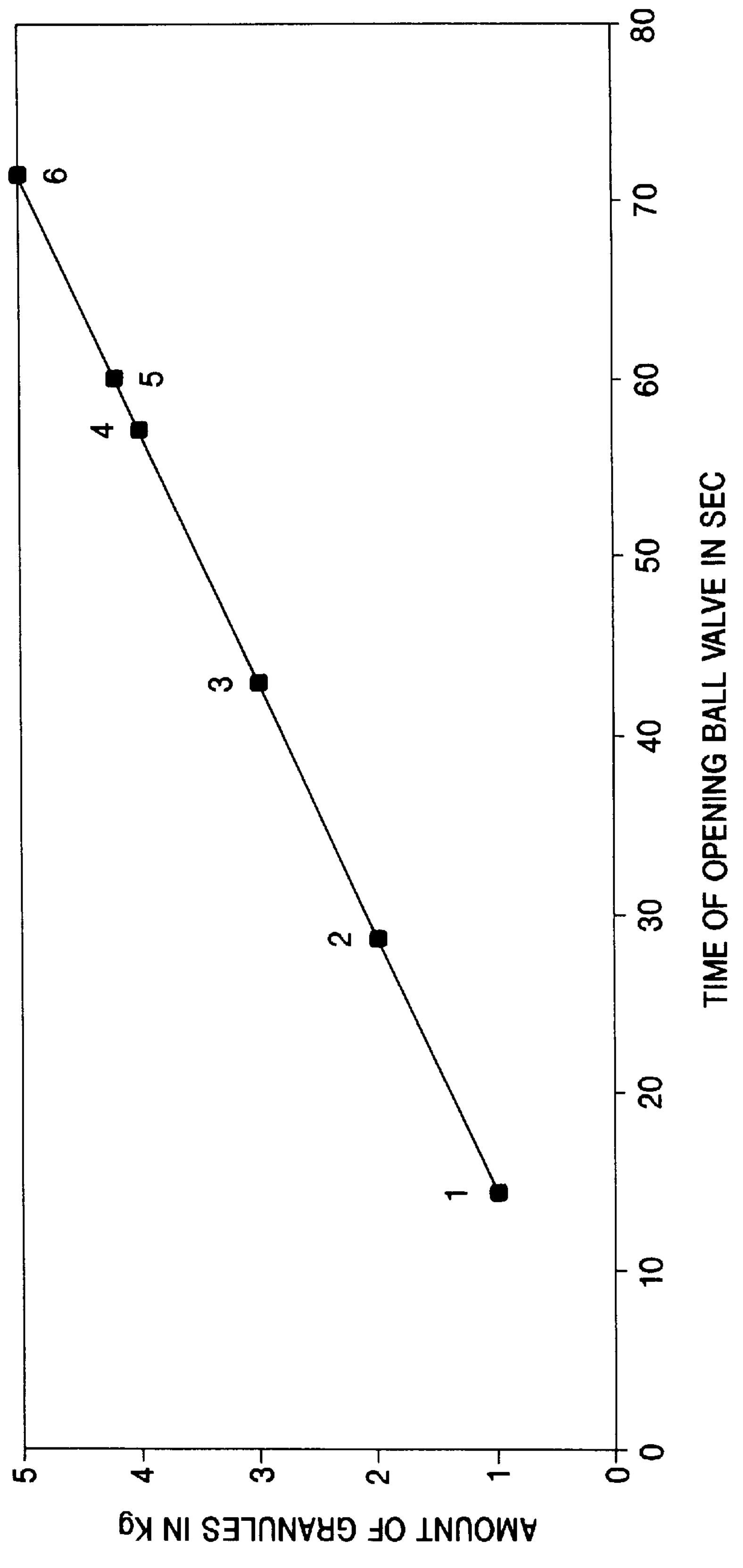
FIG. 3 shows a typical calibration curve.

FIG. 1 shows the lower part of the discharge hopper 1 of a solids storage container. The cone 2 is arranged in the hopper 1, which cone can be raised via a pneumatic lifting device 3, which is attached to the hopper wall via supports 32. The left-hand side shows the cone 2 in the closure position, and the right-hand side shows the cone 2 in the open position. Compressed gas is supplied via line 31 in order to raise the cone 2. The liquid jet pump 4, comprising propelling nozzle 41, intake chamber 42, mixing chamber 43 and diffuser 44, is situated beneath the hopper. The solid particles passing through the annular gap 21 in the open position of the cone 2 flow through the connection pipe 5 into the intake chamber 42 of the liquid jet pump 4. The connection pipe 5 furthermore comprises the ball valve 6, which is shown in the open position. Furthermore, guide plates 51, which ensure an axially parallel flow of the solid particles, are provided in the connection pipe 5.

The metering and conveying device according to the invention is operated as follows: To initiate the metering operation, first of all the cone 2 and the ball valve 6 are in the closure position. The liquid jet pump 4 is acted on by liquid at a pressure of from 0.5 to 6 bar, it being possible to provide a pressure-regulating valve (not shown), until a stable liquid jet has formed. The ball valve 6 is then opened, whereupon the cone 2 is moved into the open position. Depending on the quantity of solid to be metered, the cone 2 is moved into the closure position after a period of, for example, 2 to 5 minutes, then the ball valve 6 is closed and the cleaning nozzle 7 is supplied with liquid. After cleaning the liquid jet pump, the liquid supply is interrupted until the next metering operation is initiated. Preferably, a non-return valve is provided downstream of the outlet of the liquid jet pump, which non-return valve prevents the cleaning liquid from flowing back.

Example

A device in accordance with FIG. 1 is used. The base of the cone 2 has a circumference of 150 mm. In the open position, the cone 2 is raised by 10 mm, so that a gap having a width of 6 mm is left open. The diameter of the connection pipe 5 is 25 mm. The propelling nozzle has a diameter of 7.5 mm, the intake chamber a length of 50 mm, the mixer tube a diameter of 17 mm and a length of 40 mm. Plant protection agent granules having a particle size of less than 2 mm is used. The liquid jet pump 4 is supplied with water at a pressure of 1 bar, so that the liquid jet passes through 35 l/min. It was established by repeated calibration that 4.2 kg of plant protection agent granules were conveyed per minute, the deviation between the individual calibration tests being less than 2%.

We claim:

1. Method for contamination-free metering and conveying of a solid powder which is to be dispersed or dissolved in a dispersing agent or solvent, from a solids storage container to a dispersing or dissolving tank, the solids storage container having a discharge hopper having an inner wall, coaxially with which a downwardly widening cone having a base edge is arranged, which in a closure position rests with the base edge thereof on the hopper inner wall and in an open position is raised from the hopper inner wall so as to leave open an annular gap, said method comprising operating a liquid jet pump with the dispersing agent or solvent to form a liquid jet, supplying said solid powder in a freely flowing manner to said liquid jet pump, said supplying including opening said cone to said open position, dispersing said solid powder in the liquid jet and conveying said solid powder by said liquid jet into the dispersing or dissolving tank, metering an amount of the solid powder with reference to a calibration curve by controlling the amount of time for which the cone is in the open position, and filling the dispersing or dissolving tank with the dispersing agent or solvent.

2. Method according to claim 1, further comprising, after the end of said metering, closing a ball valve which is arranged between the discharge hopper and the jet pump in a liquidtight manner, interrupting the liquid jet, and flushing the jet pump by injecting additional dispersing agent or solvent transversely to the direction of the liquid jet.

3. Method according to claim 1, wherein said solid powder and said dispersing agent or solvent are supplied to said jet pump in amounts to a form a mass ratio of liquid to solid powder in the liquid jet of between 1 and 20.

4. Method according to claim 1, wherein the width of the annular gap in the open position of the cone is at least three times the width of the mesh in a screen which allows through 90% by weight of the solid powder.

5. Device for contamination-free metering and conveying of a solid powder which is to be dispersed or dissolved, from a storage container for the solid powder to a dispersing or dissolving tank, said device comprising a discharge hopper for the solid powder arranged beneath the storage container, a cone arranged in the discharge hopper, said cone being movable in an axial direction, widening downwards to a base, and in a closure position resting with the base of the cone on the inner wall of the hopper and in an open position being raised from the hopper wall so as to leave free an annular outlet gap, and a liquid jet pump arranged beneath the hopper, and being supplied with said solid powder from the hopper by a hopper discharge pipe, and which forms a liquid jet which feeds into a connection line to the dispersing or dissolving tank.

6. Device according to claim 5, further comprising a ball valve arranged between the discharge hopper and the jet pump.

7. Device according to claim 5, wherein the jet pump has, transverse to the direction of the liquid jet formed by said jet pump, a nozzle for introducing a flushing liquid.

8. Device according to claim 5, wherein the liquid jet pump comprises a propelling nozzle, an intake chamber, a mixer tube, and a diffuser, and produces a liquid jet which is longer than the diameter of the hopper discharge pipe.

9. Device according to claim 8, wherein the internal diameter of said mixer tube is from 2 to 3 times that of the propelling nozzle.

10. Device according to claim 8, wherein the diffuser has an included angle of from 2° to 5°.

* * * * *